United States Patent
Calvignac et al.

(10) Patent No.: US 6,714,562 B1
(45) Date of Patent: Mar. 30, 2004

(54) METHOD AND APPARATUS FOR SEGMENTING NETWORK TRAFFIC VARIABLE LENGTH FRAMES

(75) Inventors: Jean Louis Calvignac, Cary, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,369

(22) Filed: Mar. 10, 2000

(51) Int. Cl.⁷ .................................................. H04J 3/24
(52) U.S. Cl. .................. 370/474; 370/395.52; 370/466; 370/476
(58) Field of Search .............................. 370/389, 395.1, 370/395.5, 395.52, 395.53, 395.6, 395.63, 395.64, 395.65, 400, 401, 419, 420, 421, 412, 428, 429, 465, 466, 467, 469, 474, 476; 709/230

(56) References Cited

U.S. PATENT DOCUMENTS

| | | | |
|---|---|---|---|
| 4,516,240 A | | 5/1985 | Kume et al. |
| 5,570,362 A | * | 10/1996 | Nishimura ................... 370/466 |
| 5,602,853 A | * | 2/1997 | Ben-Michael et al. ...... 370/474 |
| 5,606,552 A | | 2/1997 | Baldwin et al. |
| 5,606,558 A | | 2/1997 | Daniel et al. |
| 5,625,625 A | * | 4/1997 | Oskouy et al. .......... 370/395.4 |
| 5,774,469 A | | 6/1998 | Wirkestrand |
| 5,781,549 A | * | 7/1998 | Dai ............................. 370/398 |
| 5,790,544 A | | 8/1998 | Aho et al. |
| 5,822,321 A | | 10/1998 | Petersen et al. |
| 5,878,045 A | | 3/1999 | Timbs |
| 5,884,064 A | | 3/1999 | Rosenberg |
| 5,898,688 A | * | 4/1999 | Norton et al. ............... 370/362 |
| 5,930,251 A | | 7/1999 | Murakami et al. |
| 5,940,385 A | | 8/1999 | Mita et al. |
| 5,946,309 A | | 8/1999 | Westberg et al. |
| 5,956,348 A | | 9/1999 | Creigh et al. |
| 6,075,790 A | * | 6/2000 | Lincoln et al. .............. 370/398 |
| 6,249,528 B1 | * | 6/2001 | Kothary ....................... 370/466 |

* cited by examiner

*Primary Examiner*—Douglas Olms
*Assistant Examiner*—Bob A Phunkulh
(74) *Attorney, Agent, or Firm*—Joscelyn G. Cockburn (57) ABSTRACT

Method and apparatus for segmenting variable length frames into fixed length cells in a network equipment. The method allows preparing information to build the cells resulting in the segmenting of a succession of frames directed to the same destination in said network equipment. The cell may be packed with more than one frame. The cell information comprises the address where to read the frame data in a first storage unit, the cell header itself which indicates if the cell includes data from one packet or for more packets, a pointer per each of said more packets, designating the place of the end of data of the previous packet in the cell and a cell type field indicating one of the following types: a start of a new frame type, a continuation of frame type, a end of current frame type and a start and a end of a new frame type. The segmenting apparatus comprises a finite state machine using an Add/substract unit to compute the cell information and write said cell information in a second storage unit.

11 Claims, 12 Drawing Sheets

| Word | Byte 0 | Byte 1 | Byte 2 | Byte 3 |
|---|---|---|---|---|
| W0 | ▓▓▓ | ▓▓▓ | ▓▓▓ | ▓▓▓ |
| W1 | ▓▓▓ | ▓▓▓ | | |
| W2 | | | | |
| W3 | | | | |
| W4 | | | | |
| W5 | | | | |
| W6 | | | | |
| W7 | | | | |
| W8 | | | | |
| W9 | | | | |
| WA | | | | |
| WB | | | | |
| WC | | | | |
| WD | | | | |
| WE | | | | |
| WF | | | | |

METHOD AND APPARATUS FOR SEGMENTING NETWORK TRAFFIC VARIABLE LENGTH FRAMES

CROSS-REFERENCE TO RELATED APPLICATION

The present application relates to application Ser. No. 09/523,467, filed the same day as the present invention and assigned to the assignee of the present invention.

FIELD OF THE INVENTION

The present invention relates to network equipment receiving and transferring data packets on network lines and requiring segmentation of these packets into fixed length cells or to reassemble the frames from fixed length cells. More particularly, this invention relates to network adapters or blades performing such conversions.

BACKGROUND OF THE INVENTION

Segmenting long variable frames into fixed length cells or reassembling variable frames from fixed length cells is handled today in network node adapters having to perform network protocol conversions when rerouting traffic from one network link to another when the network protocols are different. This is the case when variable length frames are received on an input LAN network link of an adapter and are sent as ATM fixed length cells on one output ATM link on the same adapter. The variable LAN frames received from the LAN input line are converted into ATM 53 byte cells before being sent on the ATM output line. One other case applies to a network node comprising a switching fabric supporting fixed length cells. The LAN frames received from LAN network lines need to be converted into fixed length cells before being sent to the bus of the switch fabric which will switch the cells toward a target adapter or blades.

As the segmenting function may be used on high speed links in network equipment and should sustain media speed and/or the switch fabric high speed, the network equipment manufacturers usually try to optimize the design of such a function. More particularly, in the implementation of segmenting variable length frames into cells, the way the cells are filled up with frame data has a direct effect on the throughput in the switching node. If the length of the frame is not a multiple of the cell length, bytes are unused in the last cell of the cells resulting from the segmenting of a frame. This induces a traffic bandwidth loss which is not negligible for high speed traffic. It can cause loss of 50% of the available bandwidth to the segmented traffic in the case of Ethernet traffic of 64 byte frames that are sent to a switch fabric which switches 64 byte fixed length cells. In this case, a 3 Gb network port of the blade will transmit only 1.5 Gb of efficient data over the switching fabric.

The background art for segmenting is the specification of the SAR (segmentation and reassembly) sublayer of the ATM Adaptation layers described in I.362 and I.363 ITU-T recommendations. More particularly for LAN frame traffic conveyed over ATM, the AAL4 or AAL5 SAR are used. These recommendations provide a message structure to segment the data units into cells which comprise a header and a trailer and only one information bit in the last cell of the frame. These recommendations do not take into consideration the space lost when all the cells are not all filled with frame data and thus does not prevent the lost of bandwidth in the segmented traffic generated by the adapters.

It is thus a general object of the present invention to provide a method and apparatus to save bandwidth when generating traffic resulting from the segmenting of variable length frames into fixed length cells.

SUMMARY OF THE INVENTION

This object of the invention is achieved by an apparatus, in a network equipment, for segmenting a succession of variable length packets stored as words in a first external storage unit into fixed length cells, said apparatus comprising:
  a first input bus accessing the packet words of said first storage unit;
  a second connecting bus accessing a second storage unit;
  a finite state machine reading through said first bus the packet words in said first storage unit of the successive packets to be segmented;
  an Add/substract unit, activated by said finite state machine through an internal bus, receiving input data from said finite state machine and from said second storage unit, said Add/substract unit computing the cell content, storing in said second storage unit cell information describing said cell content, said cell content comprising a defined fixed length cell header, data from one packet and data from other packets of said succession of packets if they are found in said first data store and if there is space enough in the cell to enter at least a defined fixed length new packet header after the last data of the previous packet;
  a third connecting bus, connected to said finite state machine, through which a signal is received by said finite state machine requesting a new cell information, said finite state machine sending back through said third bus an acknowledgment when storing of cell information in said second storage unit is completed.

The invention also provides a method for preparing cell information describing the cell content to build the cells resulting from the segmenting of a succession of variable length packets stored as words in a first storage unit into fixed length cells, said method comprising:
  reserving in the cell content the cell data for a defined fixed length cell header;
  reading the packet data stored in said storage unit and reserving the cell space following the cell header for said packet data;
  if the packet data does not completely fill the cell, checking if the remaining space in the cell is sufficient to contain at least a defined fixed length packet header;
  if the remaining space in the cell is sufficient to contain at least said packet header, reserving the cell space for the next packet data;
  repeating the previous two steps until the packet data completely fills the cell or the remaining space in the cell is not sufficient to contain at least one packet header;
  if the packet data completely fills the cell, storing information describing the cell content, signaling to an outside interface that this information is ready and restarting the method at the first step until the last cell is written for said succession of packets.

One advantage of the solution is to enable a software or a hardware implementation. Another advantage is, when the invention is used in a network switch to segment variable frames into fixed length cells switched by a switch fabric, to allow the use for a less powerful switch fabric, having a higher clock cycle, which saves costs in the network switch.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DESCRIPTION OF THE PREFERRED EMBODIMENT

Figure 1:
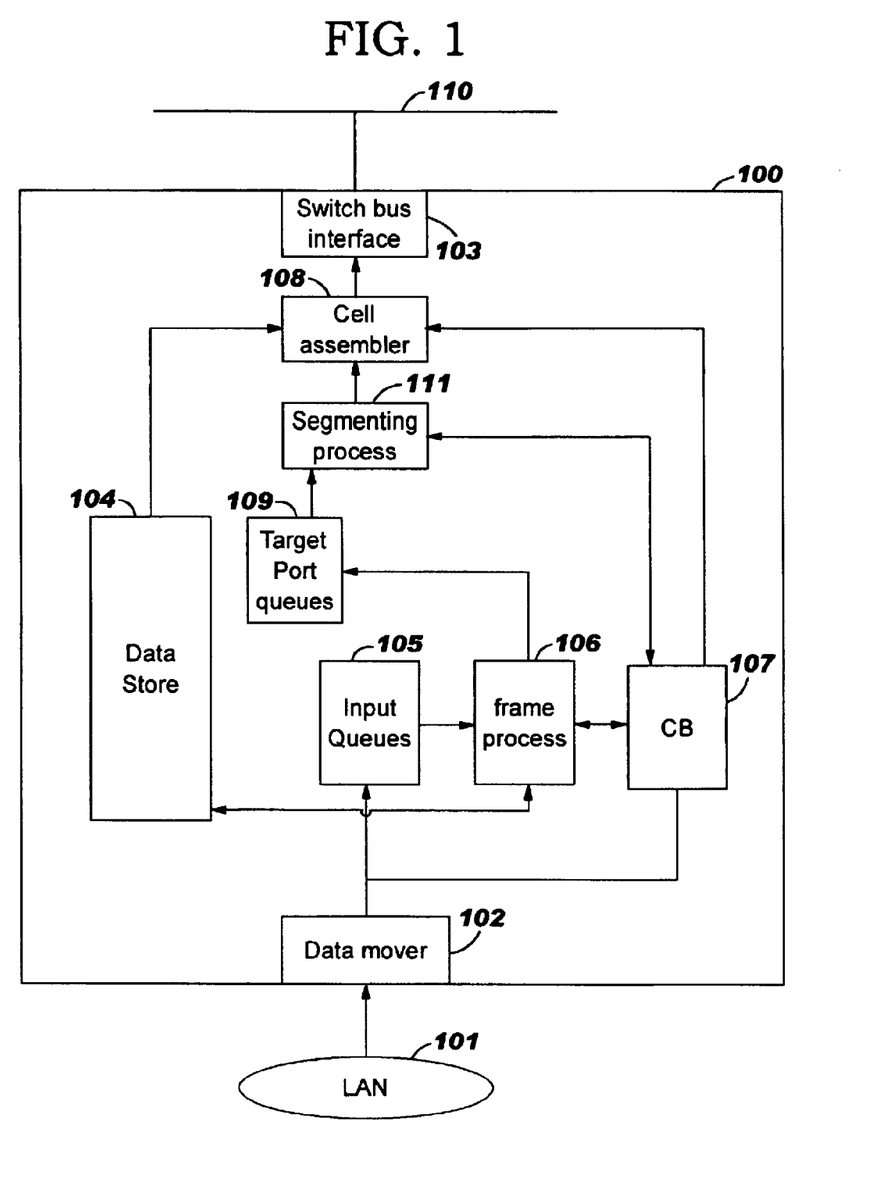
FIG. 1 is an illustration of network adapter functions including the frame segmenting that are implemented in a network adapter (or blade)

FIG. 1 describes the network adapter (100) (or hub blade) logical block components of a network node which may be a switching node comprising a switching fabric which switches fixed length cells. The components of the adapter, which could be implemented in hardware and/or in software, comprise a preferred embodiment of the invention implemented as the so called segmenting process (111) logical block. The network adapter converts variable length frames received from the network (101) into fixed length cells and sends the cells on the bus (110) of a switch fabric in the preferred embodiment of the invention. The cell traffic will be switched to one or more target network output ports of one or more adapters in the switching node. The network adapter is connected to the network illustrated by a LAN (101). The data received on the network lines being variable length frames such as the Ethernet LAN frames. The adapter receives the input data flow on its network physical interface and performs the data movement (102) toward a storage unit, the data store (104), while updating the frame input queues (105). A frame process (106), prepares the frame information in the control blocks, CB (107), one of this information being the address of the beginning of the frame in the data store. The frame process also builds the target port queues (109) by identifying the target port via a lookup process using frame data as input. One example of it being a look up of the MAC destination address. The scheduler, not represented in the figure, decides, on the basis of an algorithm, which port queue to activate. The segmenting process prepares the cells and cell information by updating the control blocks, CB (107). The actual process of cell assembly is performed by a dedicated component, the cell assembler (108), which uses as inputs the frame data in the data store and information in the control blocks (107) and moves the data into a cell buffer. Once assembled, the cell is transferred through a switch bus interface (103) on the bus of the switching fabric. The segmenting process component (111) computes the cell structures corresponding to one or more frame which have been selected to be segmented and writes in the control blocks (107) the data (cell header, frame header) and other cell information which will be read and used by the cell assembler to actually build the cell. One of these cell information is the address in the data store where to start reading frame data for building the cell. The segmentation process may operate in a fashion where the entire frame is segmented before moving to the next frame selected by the scheduler, or may segment only one cell of many cells required for frame; the later requires that the scheduler present the frame again at a later time to continue the process, one cell for each service, until the frame is completed.

Figure 2:
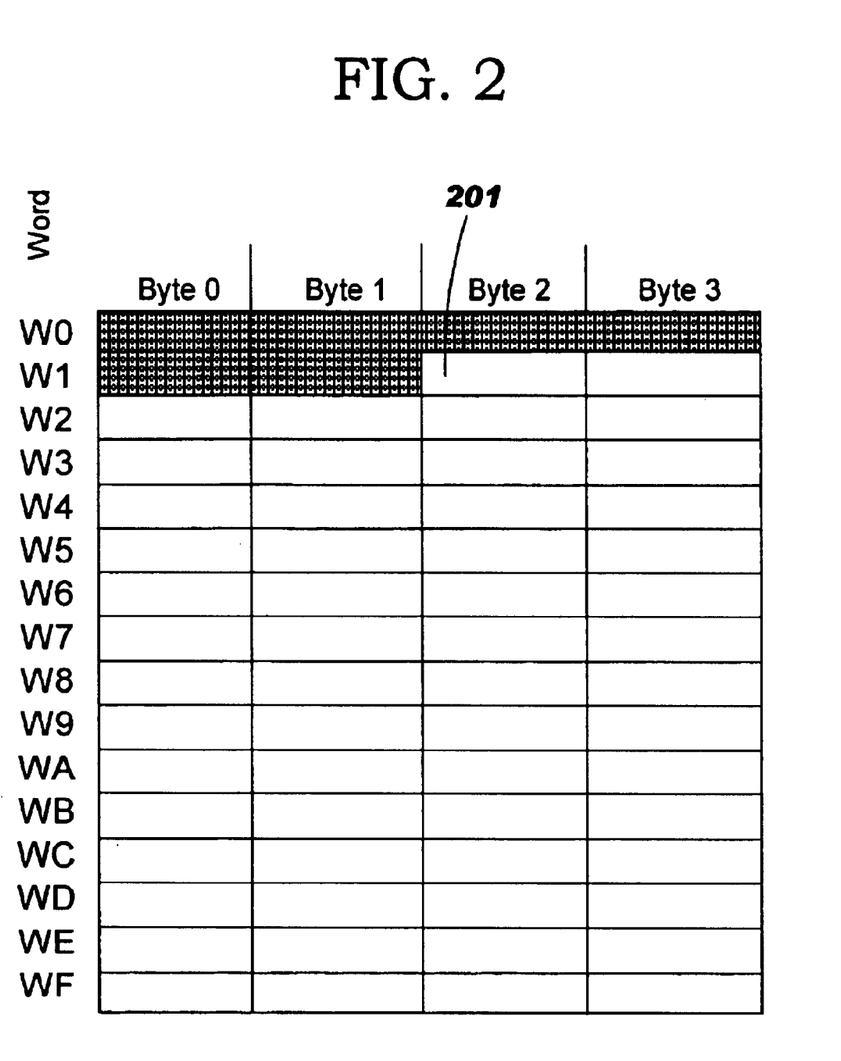
FIG. 2 illustrates the structure of an intermediate cell among the cells resulting from the segmenting of a frame, which does not contain a frame header.

FIG. 2 illustrates the structure of a cell according to the preferred embodiment. This cell is an intermediate cell, resulting from the segmenting of a frame. This means that at least one cell has been already prepared for this frame which contains the frame header. This cell does not contain a start of frame indication. In the preferred embodiment, each cell is 64 byte long. Each cell has a 6 byte cell header. The cell header is inserted in the first bytes of the cell. The frame data starts at the byte following the cell header at 201. The remaining part of the cell may be entirely filled with the frame data. The general rule is, if one frame ends without filling all the cell, a new frame is inserted. However, it may happen that a new frame cannot be selected for insertion. This happens when there are no other frames available to be sent to the same target port in the target port queue selected by the scheduler, or when there is not enough space, according to the cell packing rule explained later with FIG. 3, to start the storing of a new frame. In this case, the end of the cell, not filled with frame data, is left unused.

Figure 3:
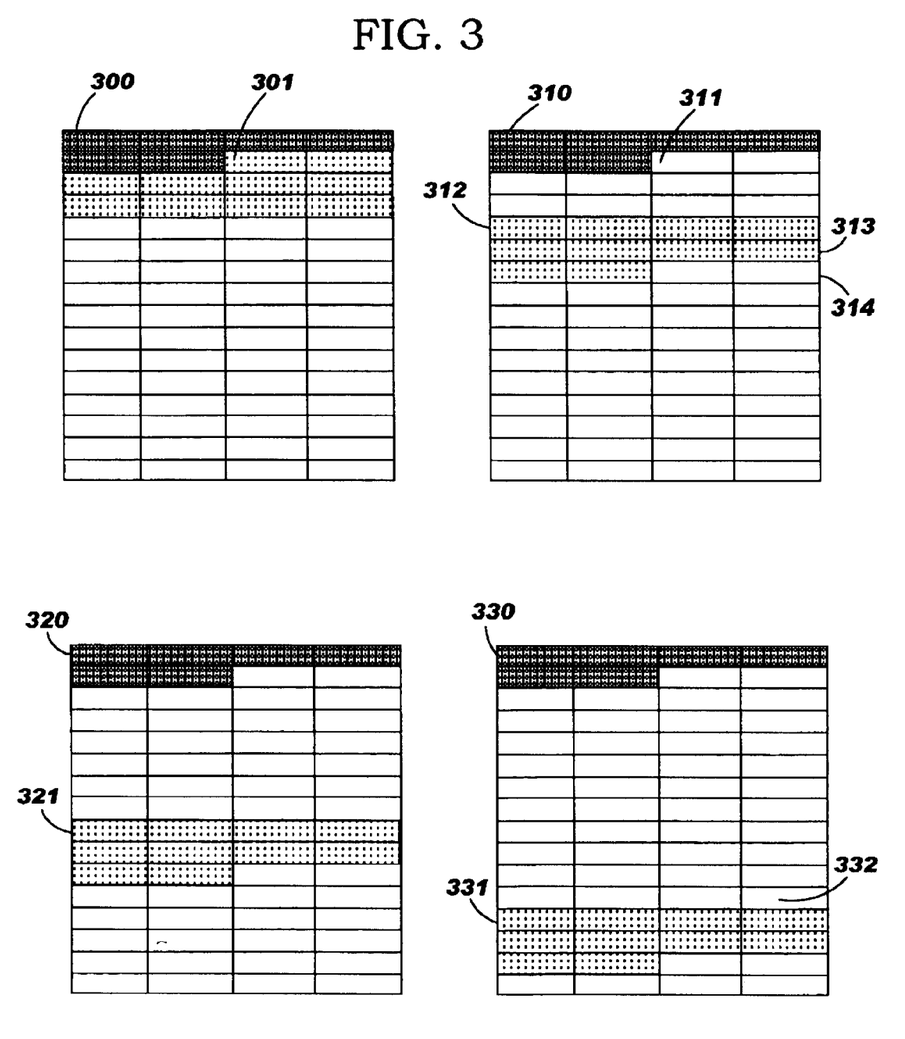
FIG. 3 shows the four possible cells containing a frame header, result of the segmenting of frames according to the preferred embodiment of the invention.

In FIG. 3 are represented possible cell structures which contain a frame header according to the packing rules of the preferred embodiment. The first cell (300) illustrates a start of frame where the frame header is immediately after the cell header, shown as 301 in the figure. The three other cell structures illustrated in FIG. 3 have a frame header starting on a 16 byte boundary. This is one packing rule of the preferred embodiment. There are three 16 byte boundaries in the cell the which are at byte 312, at byte 321, and at byte 331. These three boundaries define the three other possible structures for a cell containing a frame header. The choice of 16 byte boundaries is related to the data storage capabilities in the adapter. Should the data store have different capabilities, this packing rule can be adapted to it. This choice of the implementation of the invention is the result of a trade off between the complexity of the design of the adapter functions and the saving of the bandwidth. As shown in the last figures, the improvement on the use of the bandwidth with this packing rule of the preferred embodiment and with this packing rule is very significant.

Figure 8:
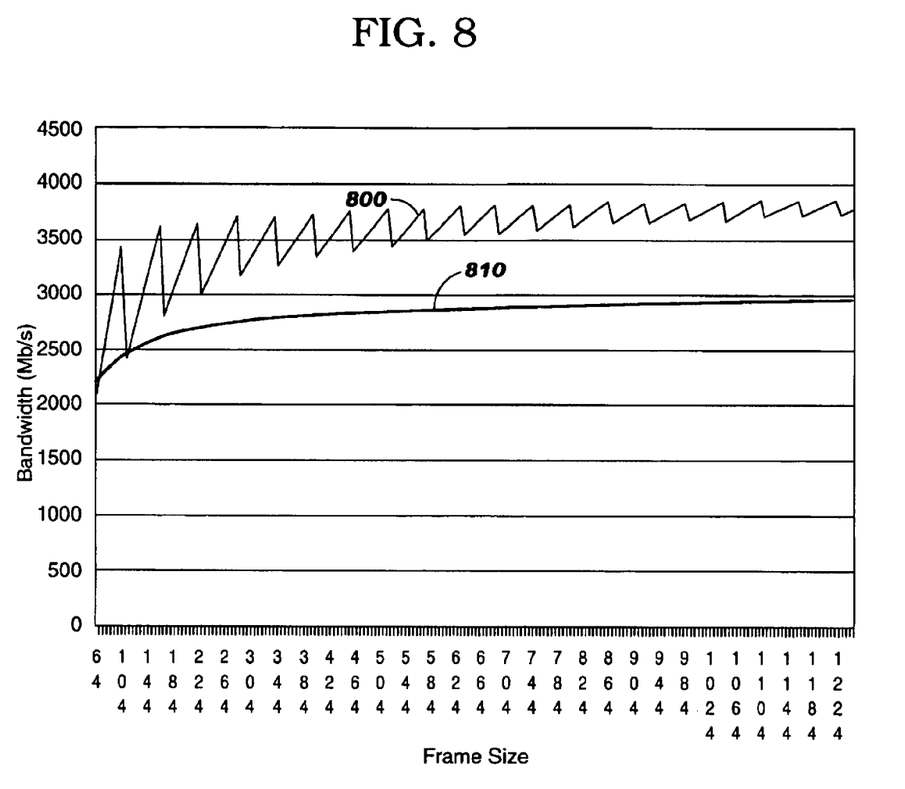
FIG. 8 is a curve expressing the variation of the bandwidth of the cell traffic, result of the segmenting of Ethernet frames performed without using the invention, as a function of different frame sizes when using a processor and switch of 7.5 ns.
Figure 9:
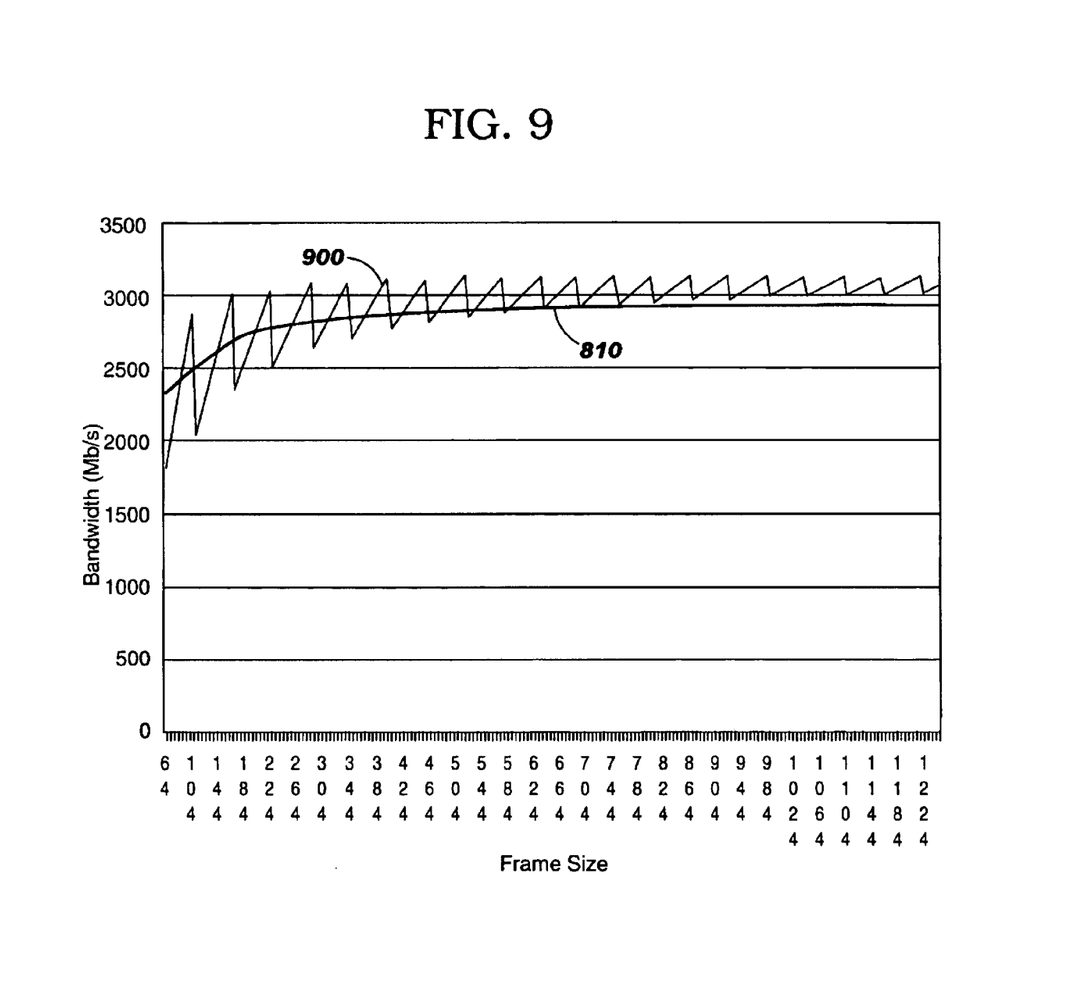
FIG. 9 is a curve expressing the variation of the bandwidth of the cell traffic, result of the segmenting of Ethernet frames performed without using the invention, as a function of different frame size/when using a processor and switch of 9.09 ns.
Figure 10:
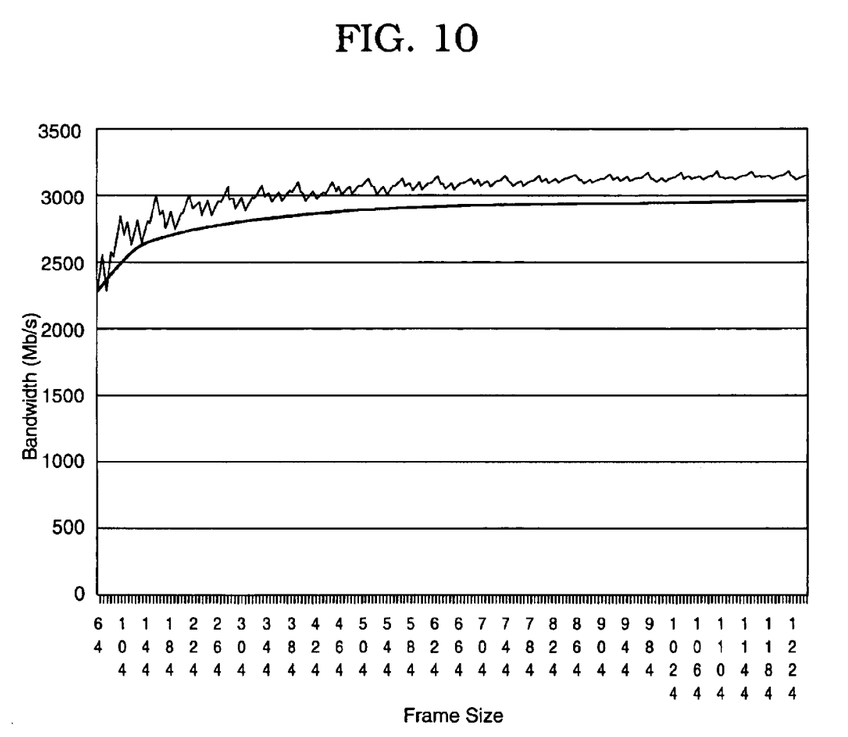
FIG. 10 is a curve expressing the variation of the bandwidth of the cell traffic, result of the segmenting of Ethernet frames as a function of different frame size when using a processor and switch of 9.09 ns, while using the invention with a frame header of 10 bytes restricting the start of the frame header as shown in FIG. 3.

Returning to the description of the four structures of FIG. 3, with the frame header starting at byte (301), this is the only case in this embodiment where the frame header is not constrained to starting on a 16 byte boundary. In the three other cases between the cell header and the frame header, is stored the data of the previous frame directed to the same port. It may happen that the storage between the end of the cell header and the next frame header at a 16 byte boundary is not fully used by the previous frame. This is a result of the packing rule, however, as illustrated in FIG. 8, FIG. 9 and FIG. 10, the bandwidth recovered is still significant.

In the four cell structures considered in FIG. 3, following the frame header is the frame data. As discussed in FIG. 2, the remaining space in the cell is used for frame data. However, a frame may not be long enough to fill the space. Unlike the previous discussions, a new (second) frame header may not be inserted in the preferred embodiment and the remaining space remains unused. Thus, a second packing rule of the preferred embodiment does not permit more than one frame header in a cell. This is a choice of implementation and is the result of a trade off between the complexity of the design of adapter functions and the saving of bandwidth. For applications such as Ethernet, this is not a limitation on the implementation. For other applications, this may be a limitation which results in a loss of bandwidth; in those cases this packing rule may be discarded.

It is noted also that the use of cell packing in the segmenting process may be optional. When no cell packing is used the only cell structure resulting in the segmenting of a frame are the first cell structure of FIG. 3 starting at byte 300 and the cell structure of an intermediate cell of FIG. 2.

Figure 4:
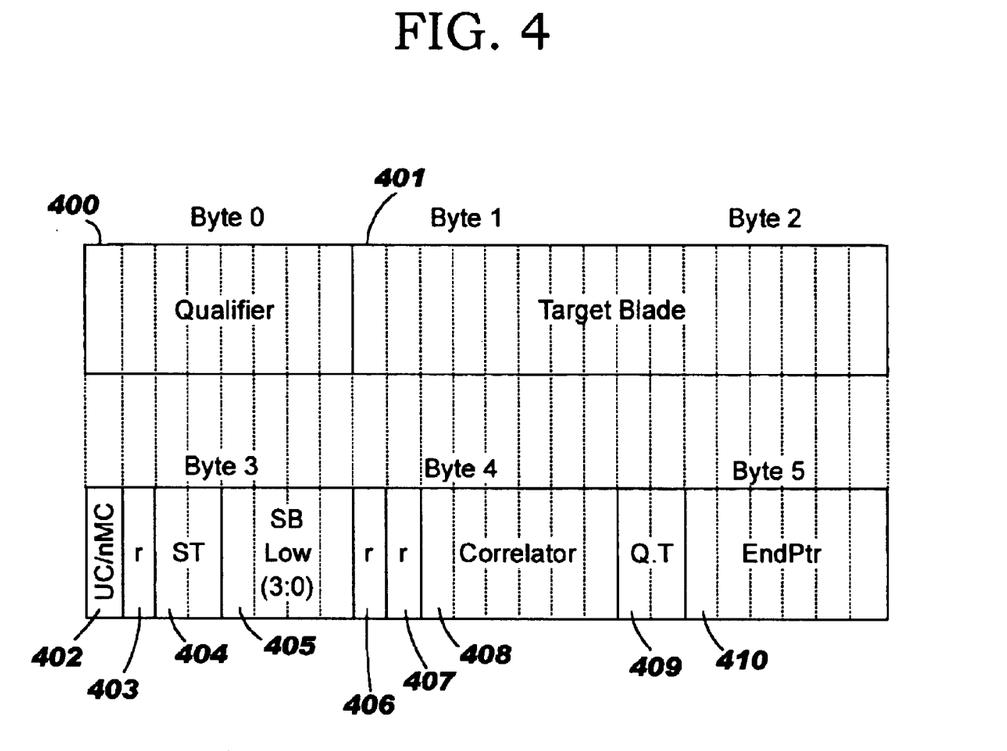
FIG. 4 illustrates the 6 byte cell header format according to the preferred embodiment of the invention.

FIG. 4 illustrates a cell header used in the preferred embodiment. The information found in the cell header is created from the contents of the control blocks (107) for the selected frame, that has been created by the frame process (106) and the segmenting process (111). The information provided by the segmenting process which is unique for each cell sent and placed into the cell header, is used by a reassembly component of the destination adapter.

The qualifier (400) contains information created by both the frame process (106) and the segmenting process (111). The cell format value, which is created by the segmenting process, is a two bit field found in the qualifier. In the preferred embodiment, the cell format value indicates if the cell contains data from a single frame (unpacked) or data from two frames (packed). However, if the second packing rule which limits the number of frame headers in a cell is not used in an implementation, then, the cell format must also indicate the presence of multiple frames in the cell. This information is necessary to the implementation of the reassembly component of the destination adapter.

When the cell format value indicates a single frame, the cell structure is limited to those shown in FIG. 2, or (300) shown in FIG. 3. The qualifier can include other information such as the priority of the cell but which are used by other components of the network equipment and are not part of the segmenting process. The second cell header field (401) is 16 bits; it indicates the target blade, an information necessary for the switching of the cell in the switch fabric but not related to the segmenting process of the preferred embodiment. The next bit is used to specify if the cell uses a unicast or a multicast format. This is not related to the segmenting process. The next bit (403) is reserved and the two next bits of byte 3 (404) are used for the frame state indicator. The frame state indicator provides information about the status of the frame currently being carried in the cell. In the preferred embodiment, '00' means continuation of a current frame, '01' means end of the current frame, '10' means start of a new frame, '11' means start and end of a new frame. It is noted that the value '11' could be an indication of the abort of the frame transmission if the end pointer (last field of the cell header) is set to '0'. The Frame state indicator field is created by the segmenting process which is illustrated in the description of the flow chart of the corresponding method in FIG. 6 and FIG. 7. The next field (405) describes the source blade. The two next 1 bit fields (406, 407) are reserved. The correlator field (408) relates a cell to a frame. This indication is related to the segmenting process but not in relation with the improvement brought by the cell packing. This information is used by the destination adapter to reassemble the frame when receiving the cells. The next field (409) qualifies the queue type of the cells and the frame. This information is not related to the segmenting process but is used by other components of the network equipment which process specific types of frames crossing the network equipment. The final field, the End pointer (410) is created by the segmenting process. The six bits forming the End pointer field indicates the location of the last data byte in the cell when the frame state indicator field indicates the end of current frame (value either '01' or '11'). In all other cases, this field contains sequence checking information used by the frame reassembly logic located in the target blades. The End Pointer is set to '0' when the transmission of the frame is aborted. In the preferred embodiment, a third packing rule requires that only frames with the same priority and destination can be packed. This is a choice of implementation and is a result of a trade off between the complexity of the design of the adapter functions and the saving of bandwidth. This packing rule may be discarded.

Figure 5:
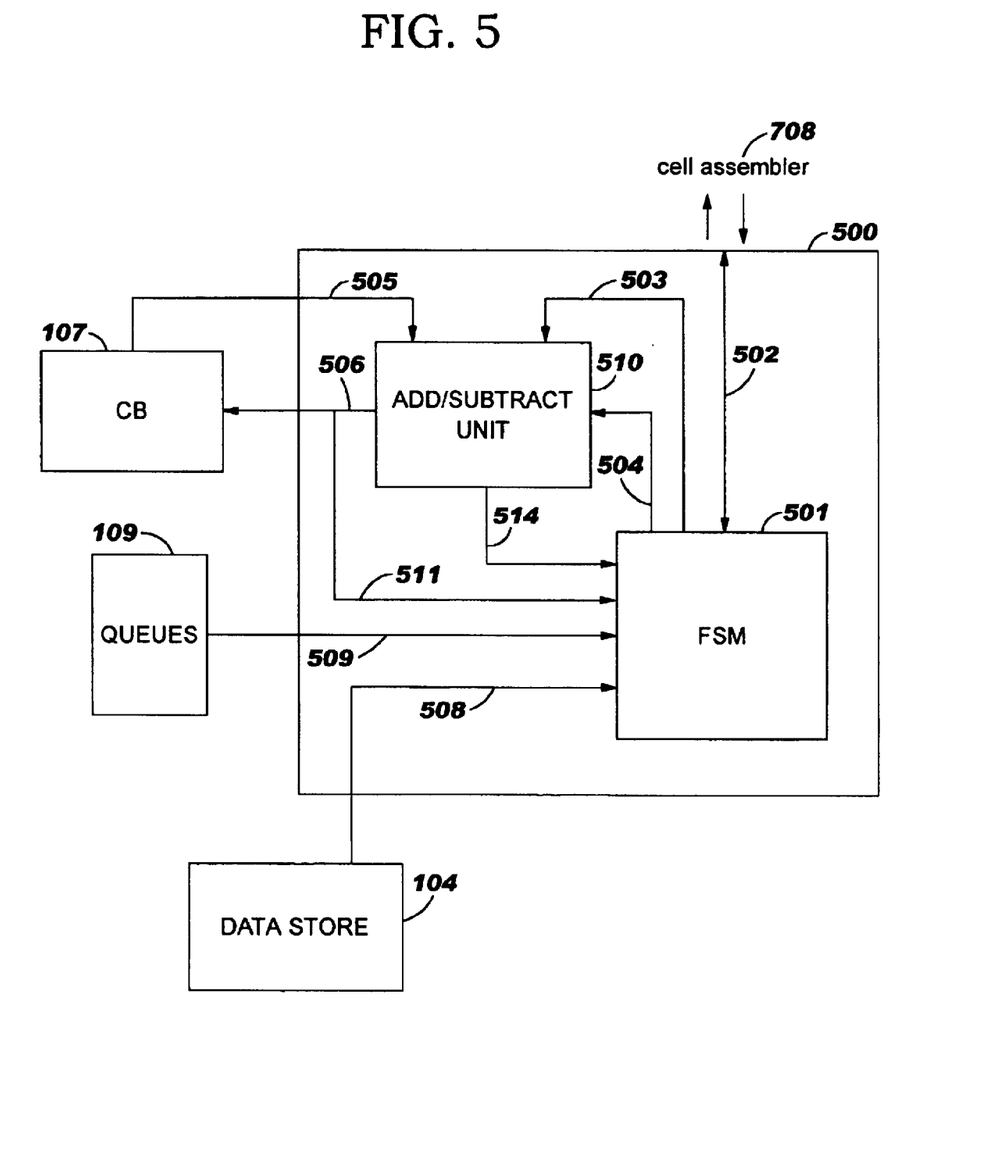
FIG. 5 illustrates a hardware implementation of the invention.

FIG. 5 illustrates the hardware components of the preferred embodiment's segmenting process (500). The interfaces to the segmenting process are the control blocks (107) containing information created by the frame process (106) and the segmenting process, the queues containing frames for each target blade, the data store (104) containing the data for those frames, and the cell assembler (108).

The segmenting process creates and updates information in the control blocks (107) via the connecting bus (506). The information the segmenting process maintains is the current frame status (start, middle, or end) used in the cell header, and the number of frame bytes remaining in the data store. Information created by the frame process is used to create other fields in the cell and frame header; i.e. target blade, or priority.

The queues (109) are organized lists of pointers to control block entries; a queue is maintained for each target blade in the network equipment. Each control block contains information about one frame.

A scheduler (not shown) selects one of the queues for service. The control block entry (pointer) at the head of the queue is used to access information about the frame to be segmented and is provided to the segmenting process via connecting bus (509). Data from the data store (104) is accessed via the connecting bus (508) using the information found in the control block. The control block is updated with the remaining byte count, cell header, and frame data address and length for the segmented cell. If this is a start of frame event, the frame header is created as well. Once the control block has been updated, and a request for cell information is received from the cell assembler (108) via connecting bus (502), the segmenting process responds to the cell assembler with the location of the control block and an acknowledgment of the request.

The main component of the frame segmenting process is a finite state machine. The finite state machine of the preferred embodiments is a generic mealy/moore state machine that the person skilled in the art can generate using a high level design language. The finite state machine executes simultaneously, under the control of one internal clock the two flow charts described in the two following figures FIG. 6 and FIG. 7 to compute the information to be put in the control blocks. One other component of the segmenting process is an add/substract unit (510) which is activated by the finite state machine through a bus (504) The add/substract unit performs calculations which the result is read back by the finite state machine through a bus (514). The input data is provided to the add/substract unit through two buses, one being originated from the control block (or control block controller) (505), the other one being originated from the finite state machine (503).

Figure 6:
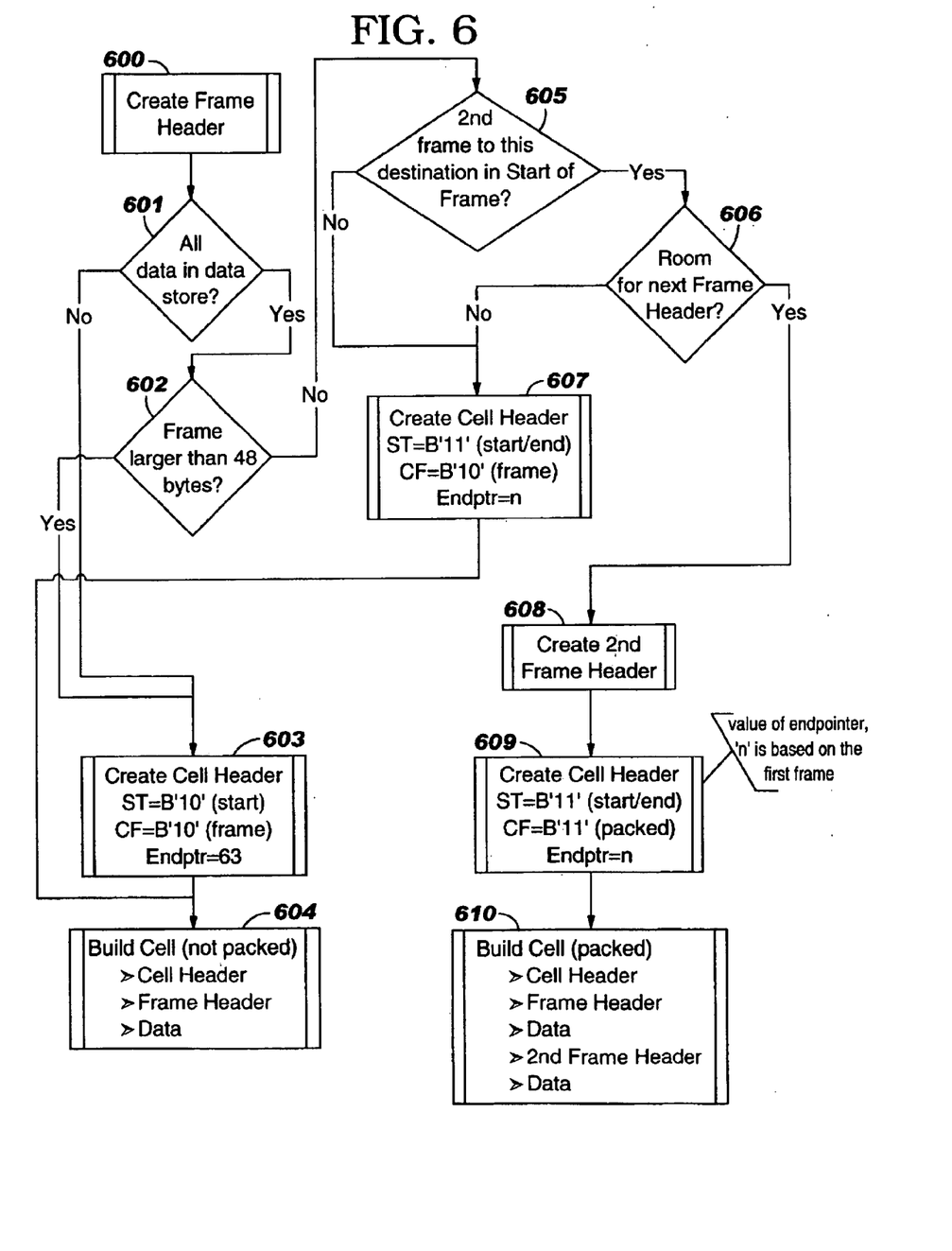
FIG. 6 is the flow chart for building the first cell, resulting from the segmenting of one or more frames, according to the preferred embodiment of the invention.

FIG. 6 is the flow chart for building a first cell for a frame which has been designated as the next frame to be segmented (first frame available in the queue designated by the scheduler). The flow chart of FIG. 6 is started because this is a start of frame and there is sufficient frame data in the data storage to fill at least one cell (at least 64 bytes of frame data stored in the data store in the preferred embodiment) or all the data for the frame is present in the data store. The first step consists in starting preparing the frame header (600) using the information about the frame already stored in the control block (107). The contents of the frame header are not described; while related to the segmenting process, it is not directly related to the improvement brought by cell packing. However, the frame header must include a correlator as described for the cell header. This information is necessary to the implementation of the reassembly component of the destination adapter. A test (601) is performed to check if the frame is entirely stored in the data store (104) by the other components of the adapter. If the answer to the test is No, the first cell is entirely filled with the frame data. The cell header is finalized (603) with the frame state indicator set to start of frame, B'10' the cell format value (of the qualifier field) indicating a single frame B'10' and the End pointer set to the last byte of the cell (63). The control block is updated with this information, the frame data address and the length for the cell, and the modified frame byte count. The information stored in the control blocks will be used by the cell assembler to build the cell. This information in the cell header will be used by the frame reassembly process to rebuild the frame in the reassembly component of the destination adapter. The cell structure built is the same as the first cell (300) of FIG. 3; it will comprise a cell header followed by a frame header followed by the frame data through the end of the cell. The step of building the cell (604) using the information stored in the control blocks is performed by the cell assembler which will move data from the data store and the control blocks to a cell output buffer which is not part of the present invention.

Returning to the test (601), if all the frame data is stored in the data store (answer Yes), the size of the frame is tested against the remaining space left in the cell once the cell header (6 bytes) and the frame header (10 bytes ) have been written. If the size of the frame data is greater (answer Yes to test 602) than the remaining space (48 bytes), the first cell of the frame is filled as previously described (603) according to the first cell structure (300) of FIG. 3 and the control blocks are updated as described above.

If all the frame data is in the data store and that the size of the frame data is smaller than 48 bytes (answer No to test 602). All the frame data will fit in the cell with space remaining in the cell. The next test performed (605) is to check if there is a new frame in the queue of frames selected by the scheduler, that is a new frame going to the same target port? If the answer to the test is No, there will be no frame packing in the cell and a cell header is prepared (607). The header will indicate the start and end of frame (ST indicator set to B'11'), the cell format value of its qualifier will be set to B'10' to indicate that there is no packing but just a single frame. The endpointer will indicate the byte of the last data byte in the cell. This value is dependent on the length of the frame. The control block is updated with the remaining byte count, frame header, cell header, and frame data address and length of the segmented cell. The corresponding cell will be built (604) by the cell assembler using the information in the control blocks. The cell structure will be the cell structure (300) of FIG. 3. It will include the cell header followed by the frame header followed by frame data ending before the end of the cell.

If there is a second frame which can be packed as directed to the same target port in the network equipment (answer Yes to test 605) and a restriction of the third packing rule, the structure of the cell is checked against the first packing rule; the frame header may be inserted only at a 16 byte boundary within the cell. This means that including the previous frame data, the cell should not be filled past (332) as illustrated in FIG. 3. If there is no room for the next frame header, the flow continues at block 607. If there is room for a next frame header, a second frame header is created (608) and the corresponding cell will be packed with the data from two frames. The cell header which is created (step 609) will indicate the end of the first frame with the frame state indicator set to B'11', the cell packing option with the cell format value indicator in the qualifier set to B'11' and the endpointer set to n indicating the last data byte of the first frame in the cell. The control block of the first frame is updated with a zero byte count, frame header, cell header, frame data address and length for the segmented cell. Once the cell has been transmitted the control block will be returned to a free pool of control blocks. The control block of the second frame is updated with the remaining byte count, frame header, cell header, and frame data address and length for the segmented cell. The cell assembler will build a cell (step 610) comprising a cell header, a first frame header, frame data, a second frame header and second frame data. The second frame header of the cell will be inserted at 312, 321, or 331 as illustrated in the cell structures of FIG. 3.

Figure 7:
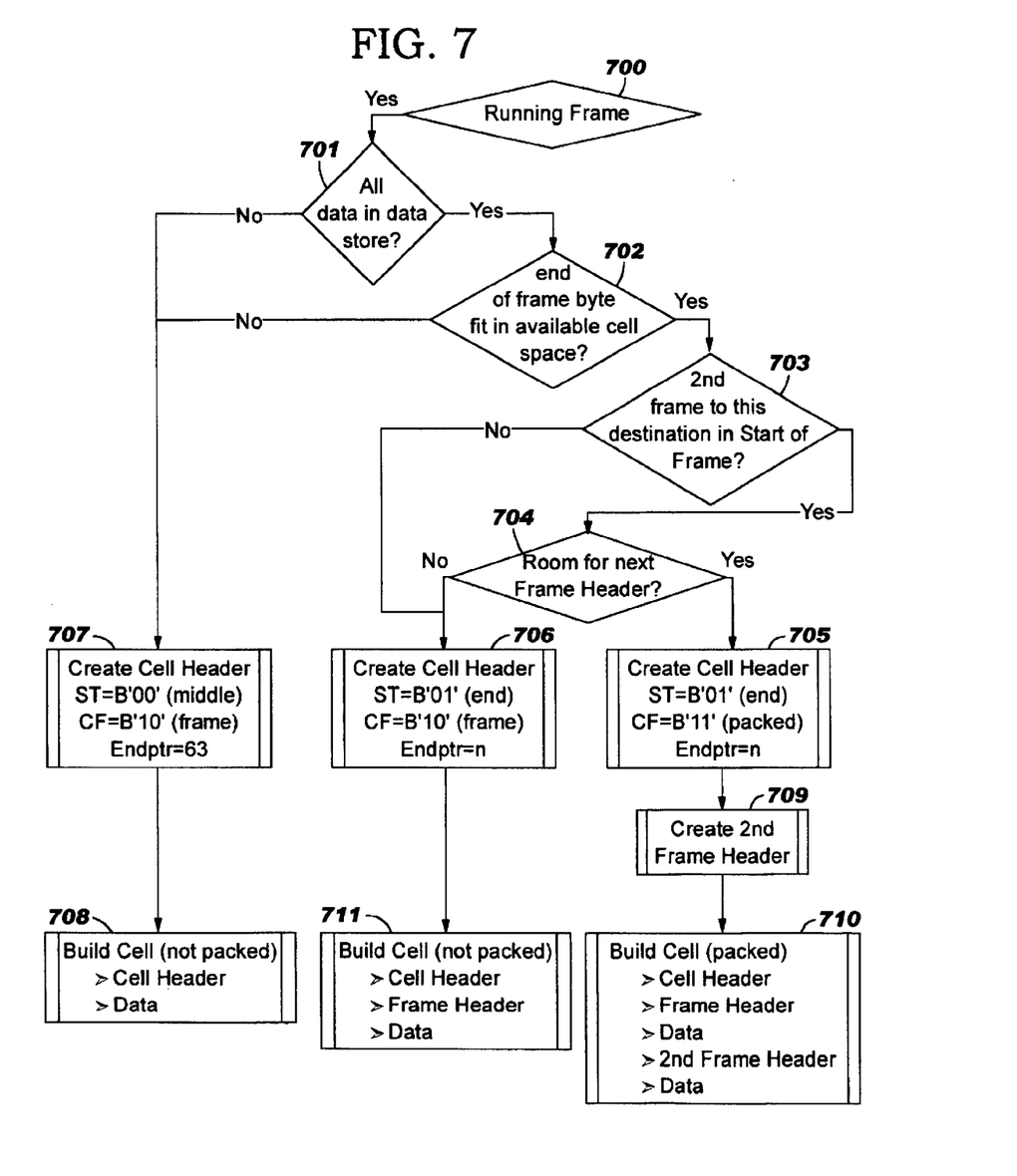
FIG. 7 is the flow chart for building an intermediate or a final cell resulting from the segmenting of one or more frames, according to the preferred embodiment of the invention.

The flow chart of FIG. 7 illustrates the preparation of the building of one intermediate or one final cell among the cells resulting from the segmenting of one or more frames. This algorithm is activated only if there is sufficient frame data already stored in the data store to build at least one cell and if one frame has already started segmenting (Yes to test 700). If all the frame data for the frame considered is not in the data store, an intermediate cell is prepared to be built having as cell data the data from the frame. A cell header is built (step 707) having a frame state indicator set to B'00' to indicate that this is an intermediate cell, a cell format value in the qualifier field set to B'10' indicating that there is only one frame in that cell, and the end pointer set to 63 to indicate that the cell data stops at the end of the cell (of 64 bytes in the preferred embodiment). The control block is updated with the remaining byte count, cell header, frame data address and length for the segmented cell. The cell assembler will build the cell (708) comprising of the cell header and the frame data and will have the same structure as illustrated in FIG. 2. When all the frame data is stored in the data store (answer Yes to test 701), if all the frame data cannot fit in the available cell space (No to test 702), this means that the remaining frame data has 58 bytes or more corresponding to the 64 byte size of the cell minus the 6 byte size cell header), process continues at block 707. If there is enough space in the cell to comprise the entire frame (Yes to test 702), that is, if the remaining frame data has less than 58 bytes, the cell in construction could be packed with a second frame. In this case, one must first check if there is any candidate frame for cell packing. If the answer to the test (703) checking if there is a second frame directed to the same target port in the queue available is No the available space in the cell will be unused. The next step will consist in preparing a cell header (706) indicating the end of frame (the frame state indicator is set to B'01'), that there is only one frame and no packing option (Cell format value of the qualifier set to B'10') and the Endpointer set to n, the value of the last data byte used for the frame in the cell. The control block is updated with a zero byte count, frame header, cell header, and frame data address and length for the segmented cell. The cell assembler will build the cell (711) comprising of the cell header and the frame data and will have the same structure as illustrated in FIG. 2.

If there is a second frame directed to the target port in the queue designated by the scheduler (answer Yes to test 703), this means that this second frame is a candidate for cell packing. However, the first packing rule must apply and a test is performed (704) to determine if there is room for next frame header in the cell (frame data occupying at the most up to (332) as illustrated in FIG. 3. If there is no room for an additional frame header in the cell (answer No to test 704), the process continues at block 706 to 711 as above.

Returning to test 704, if there is enough room in the remaining unused cell data for the frame header (answer Yes to test 704), the cell will be packed with the second frame header and data. A cell header is created (705) indicating that there is an end of frame (frame state indicator set at B'01') and that the cell is packed (cell format value set to B'11' ) and the Endpointer set to n, the location of the last data byte of the first frame in the cell. The second frame header is built (709). The control block of the first frame is updated with a zero byte count, cell header, frame data address and length for the segmented cell. Once the cell has been transmitted the control block will be returned to a free pool of control blocks. The control block of the second frame is updated with the remaining byte count, frame header, cell header frame data address and length for the segmented cell. The cell assembler will build the cell (710) comprising of the cell header and the remaining frame data of the first frame followed by the frame header of the second frame placed on a 16 byte boundary as illustrated by 310, 320 or 330 of FIG. 3, followed by data from the second frame filling the remaining space of the cell.

FIGS. 8 to 12 illustrates simulation results when comparing the effective input bandwidth from a LAN with variable length frames and the effective useful output bandwidth of fixed length cells resulting from the segmenting of the input LAN's variable length frames. The two traffics are simulated for an increasing frame size from 64 bytes to 1224 bytes. The assumption is that the cell size if 64 bytes, the cell header is 6 bytes, the frame header is 10 bytes restricted by the first packing rule. The frame increment is 4 bytes in the graphs.

In FIG. 8, the switch clock rate is 7.5 ns; 32 bits are moved each clock period The LAN effective bandwidth curve (810) shows a growing bandwidth from 2.28 Gbps to 2.95 Gbps when the frame size goes 64 bytes to 1224 bytes. The effective bandwidth of the output traffic when segmented without using the packing method of the preferred embodiment of the invention is represented by the second curve (800). The second curve mostly above the first curve, one can see that with the exception of some frames in the low end of the range, the link is able to carry 3 Gb of LAN traffic.

In FIG. 9 the switch clock rate is 9.09 ns. As with FIG. 8, the cell size is 64 bytes, the cell header is 6 bytes and the frame header, restricted to locations as illustrated in FIG. 3, is 10 bytes. Line 900 illustrates the effective bandwidth of the output traffic when the packing method of the preferred embodiment is not used. This type of switch may be employed in an application where a lower cost switch were more important than the ability to carry the full bandwidth of the attached LAN. As shown in FIG. 9, the system would be unable to supply the necessary bandwidth for most frame lengths.

Figure 11:
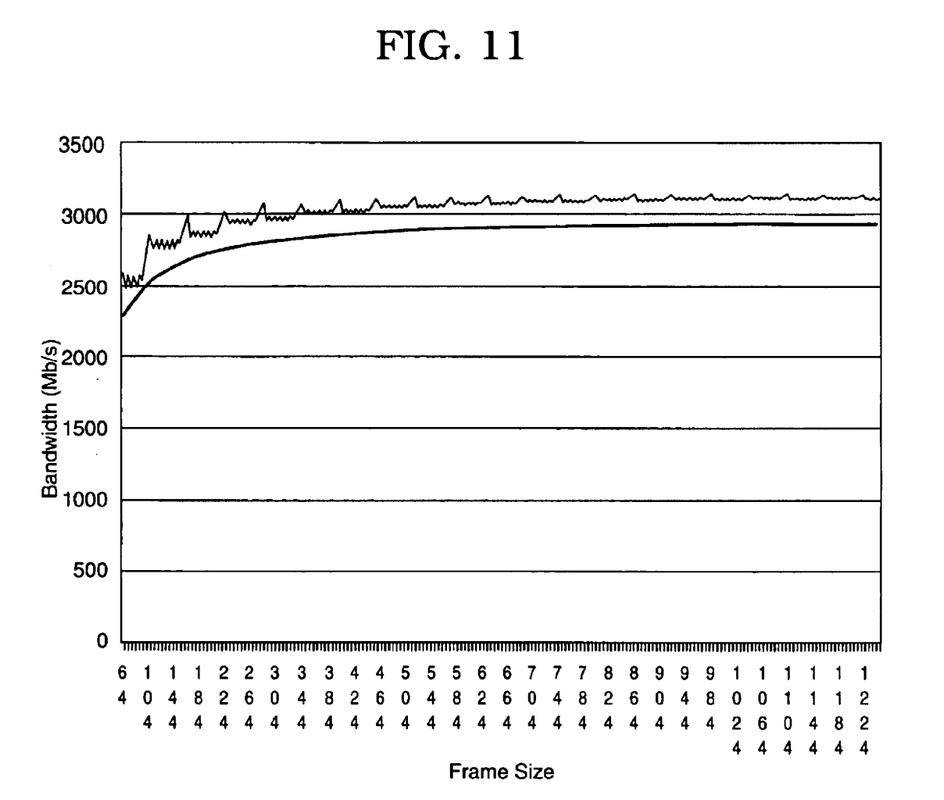
FIG. 11 is a curve expressing the variation of the bandwidth of the cell traffic, result of the segmenting of Ethernet frames as a function of different frame size when using a processor and switch of 9.09 ns, while using the invention with a frame header of 10 bytes restricting the start of the frame header to eight byte boundaries in the cell.
Figure 12:
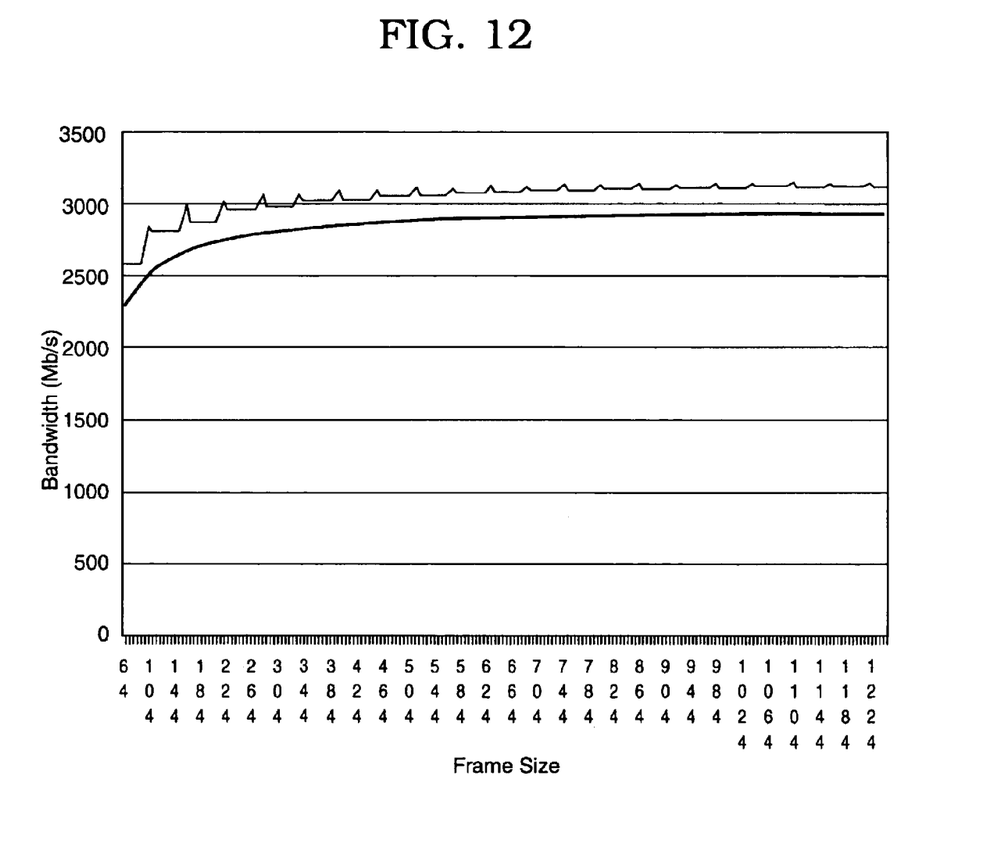
FIG. 12 is a curve expressing the variation of the bandwidth of the cell traffic, result of the segmenting of Ethernet frames as a function of different frame size when using a processor and switch of 9.09 ns, while using the invention with a frame header of 10 bytes restricting the start of the frame header to four byte boundaries in the cell.

In the next three figures, FIG. 10, FIG. 11 and FIG. 12 LAN frames have been segmented using the preferred embodiment of the invention. These three figures are representing similar curves as in the previous figures. The assumptions for these figures are a switch clock rate of 9.09 ns, the cell size is 64 bytes, the cell header is 6 bytes and the frame header is 10 bytes. In FIG. 10, the frame header is restricted to locations as illustrated in FIG. 3. In FIG. 11, the frame header is restricted to starting immediately after the cell header or on subsequent 8 byte boundaries within the cell. In FIG. 12, the frame header is restricted to starting immediately after the cell header on subsequent 4 byte boundaries within the cell. The best results, all the other assumptions being maintained, is obtained with 4 byte boundary (FIG. 12) and 8 byte boundary (FIG. 11). The link is able to carry even more than 3 Gbps of LAN traffic. With a 16 byte boundary (FIG. 10), with the exception of some frame sizes in the low range, the link is able to carry 3 Gb of effective data. Where the link fails to carry the entire traffic load, the link does carry 95% of the traffic which is a reasonable trade off of cost and design complexity.

As explained, the choice of the packing rules of the preferred embodiment is a trade off between the quality of the results and the complexity of the design. The easiest design takes into account capability and bandwidth of the adapter data store. In the preferred embodiment, the frames are stored in words of 16 bytes in the data store and the frame header is written at the 16 byte boundaries in the cell, this simplifies the addressing in the data store.

While there have been described what are considered to be preferred embodiments of the present invention, variations and modifications in the preferred embodiments will occur to those skilled in the art once they are made aware of the invention. As just one example, the invention could readily be used with other cell size and word size in the data store. However the person skilled in the art can find a trade off between the performance in terms of supported efficient user traffic and the complexity of the design of the logic, the chip or the program implementing the solution of the invention.

Cell packing can be based on a packing of cells with more than two frames; in this case a cell can comprise more than two frame headers but other pointers (such as Endpointer) to the last data byte of the other frames in the cell must be used and will be stored in the cell header.

Therefore, it is intended that the appended claims shall be construed to include not only the preferred embodiments but all such variations and modifications that fall within the true spirit and scope of the invention.

What is claimed is:

1. In a network equipment, an apparatus for segmenting a succession of variable length packets stored as words in a first external storage unit into fixed length cells, said apparatus comprising:
   a first input bus accessing the packet words of said first storage unit;
   a second connecting bus accessing a second storage unit;
   a finite state machine reading through said first bus the packet words in said first storage unit of the successive packets to be segmented;
   an Add/substract unit, activated by said finite state machine through an internal bus, receiving input data from said finite state machine and from said second storage unit, said Add/substract unit computing the cell content, storing in said second storage unit cell information describing said cell content, said cell content comprising a defined fixed length cell header, data from one packet and data from other packets of said succession of packets if they are found in said first storage unit and if there is space enough in the cell to enter at least a defined fixed length new packet header after the last data of the previous packet;
   a third connecting bus, connected to said finite state machine, through which a signal is received by said finite state machine requesting a new cell information, said finite state machine sending back through said third bus an acknowledgment when storing of cell information in said second storage unit is completed.

2. The apparatus of claim 1 wherein said cell information comprises the cell header, said cell header comprising:
   a packing status field indicating if the cell includes data from one packet or for more packets;
   a pointer per each of said more packets, designating the place of the end of data of the previous packet in the cell; and
   a cell type field indicating one of the following types: a start of a new frame type, a continuation of frame type, a end of current frame type and a start and a end of a new frame type.

3. The apparatus of claim 2 wherein said cell information further comprises the address in said first storage unit indicating starting address for reading packet data for the cell.

4. The apparatus of claim 1 further comprising a fourth input bus connected to a third storage unit storing queue addresses and to the finite state machine, said fourth bus conveying to said finite state machine the addresses, in said first data storage unit, indicating where to start reading the packet data of said succession of packets to be segmented.

5. A network adapter comprising:
   a data mover component to store input network variable length packet data received from the network data as words in a first storage unit, said data mover also creating input queues of said moved packets;
   a frame process component reading enqueued packets and creating queues of packets directed to the same destination and storing frame information in a second storage unit;
   a frame segmenting process component for segmenting said enqueued packets into fixed length cells, said frame segmenting process component comprising:
      a first input bus accessing the packet words of said first storage unit;
      a second connecting bus accessing said second storage unit;
      a finite state machine reading through said first bus the packet words in said first storage unit of the enqueued packets to be segmented;
      an Add/substract unit, activated by said finite state machine through an internal bus, receiving input data from said finite state machine and from said second storage unit, said Add/substract unit computing the cell content, storing in said second storage unit cell information describing the cell content, said cell content comprising a defined fixed length cell header, data from one packet and data from other packets of said succession of packets if they are found in said first data store and if there is space enough in the cell to enter at least a defined fixed length new packet header after the last data of the previous packet;
      a third connecting bus, connected to said finite state machine, through which a signal is received by said finite state machine requesting a new cell information, said finite state machine sending back through said third bus an acknowledgment when storing of cell information in said second storage unit is completed;
   a cell assembler sending through a connecting bus request for cell information and receiving acknowledgment from said segmenting process component that cell information is ready; said cell assembler further building the cell reading cell information from said second storage unit and packet data from said first storage unit; and
   an output interface receiving on a bus connected to said cell assembler component the cells built by said cell assembler component and sending them on an output bus.

6. A method for preparing cell information describing the cell content to build the cells resulting from the segmenting of a succession of variable length packets stored as words in a first storage unit into fixed length cells, said method comprising:
   reserving in the cell content the cell data for a defined fixed length cell header;
   reading the packet data stored in said storage unit and reserving the cell space following the cell header for said packet data;
   if the packet data does not completely fill the cell, checking if the remaining space in the cell is sufficient to contain at least a defined fixed length packet header;
   if the remaining space in the cell is sufficient to contain at least said packet header, reserving the cell space for the next packet data;
   repeating the previous two steps until the packet data completely fills the cell or the remaining space in the cell is not sufficient to contain at least one packet header;

if the packet data completely fills the cell, storing information describing the cell content, signaling to an outside interface that this information is ready and restarting the method at the first step until the last cell is written for said succession of packets.

7. The method of claim 6 wherein said storing information step comprises storing of the cell headers, said headers comprising:

a packing status field indicating if the cell includes data from one packet or for more packets;

a pointer per each of said more packets, designating the place of the end of data of the previous packet in the cell;

a cell type field indicating one of the following types: a start of a new frame type, a continuation of frame type, a end of current frame type and a start and a end of a new frame type.

8. The method of claim 6 wherein said storing information step comprises storing of the addresses in said first storage unit indicating where to start reading the data packets of the succession of packets to be segmented.

9. An apparatus to segment packets into fixed length cell comprising:

a storage storing variable length packets;

a control block storing control information including addresses of packets within said storage;

a finite state machine operably coupled to said storage and reading packets to be segmented therefrom;

an add/subtract unit operably coupled to the finite state machine, said add/subtract unit being responsive to signals from said finite state machine to compute cell contents and storing in said control block cell information describing said cell contents;

a bus, operably coupled to said finite state machine, through which a signal is received by said finite state machine requesting a new cell information, said finite state machine sending back through said bus an acknowledgment when storing a cell information in said control block is complete.

10. The apparatus of claim 9 further including a cell assembler operably coupled to the bus, said cell assembler assembling cells based upon signals received from said finite state machine.

11. The apparatus of claim 9 or 10 wherein the cell contents includes a defined fixed length cell header, data from one packet and data from other packets of succession of packets if they are found in said storage and if there is space enough in a cell to enter at least a defined fixed length new packet header after a last data of the previous packet.

* * * * *